United States Patent Office 2,976,330
Patented Mar. 21, 1961

2,976,330

METHOD OF OBTAINING CHLORINATED DERIVATIVES

Jean Guérin, Jarrie, France, assignor to Societe Anonyme dite: Societe d'Electro-Chimie d'Electro-Metallurgie et des Acieries Electriques d'Ugine, Paris, France, a corporation of France No Drawing. Filed June 19, 1959, Ser. No. 821,366

Claims priority, application France July 3, 1958

15 Claims. (Cl. 260—650)

The present invention relates to a method of obtaining chlorinated derivatives with a benzene nucleus in which one atom of chlorine substituted for an atom of hydrogen is located on this nucleus in the para-position with respect to a second atom of chlorine or to a linear radical or cyclic radical or to a functional group, these latter being also substituted for an atom of hydrogen.

It is known that the chlorination of an organic compound with a benzene nucleus results in a mixture of different chlorinated derivatives which can be fractionated; each of these fractions generally corresponds to a degree of chlorination and contains variable proportions of the various possible isomers. Definite industrial requirements have frequently led to a preferential or even selective production of a group of these derivatives or even of one of these isomers.

With these facts in view, the problem of benzene has been particularly studied. It is known that the direct chlorination of benzene by gaseous chlorine results in a mixture comprising mono-chlorobenzene and ortho-, para-dichlorobenzene, meta-dichlorobenzene, polychlorobenzenes (trichlorobenzenes and higher chlorine derivatives); the relative proportions of these various compounds vary as a function of the conditions of operation and particularly as a function of the proportion of chlorine and benzene employed, of the speed of flow of the chlorine, of the temperature, and of the catalyst.

Bourion ("Ann. Chim. 14.215–231, 1920") has made researches on the most effective conditions for obtaining mono-chlorobenzene with only a small quantity of derivatives which are more strongly chlorinated, while McMullin ("Chem. Eng. Progress 44, No. 3, 183.1948") has compared the distribution of the different compounds according to whether the operation is carried out in a continuous or non-continuous manner.

Other researches have been more particularly directed to the conditions of use of certain catalysts. For example, Wiegandt and Landos ("Ind. & Eng. Chem. 43, 2167, 1951) have studied the influence of concentration of various catalysts, the influence of temperature and of the degree of chlorination on the proportion of para-dichlorobenzene which is obtained. These researches have clearly demonstrated the effect of self-inhibition of the ortho-dichlorobenzene and the influence of polar compounds such as anhydrous acetic acid, trichloracetic acid, ethyl sulfate, but these authors have only obtained a high para-/ortho-molecular ratio by raising the degree of chlorination above 2.2. molecules of chlorine per molecule of benzene thus resulting in the formation of an appreciable quantity of more strongly chlorinated derivatives which have relatively limited use.

The United States Patent No. 1,946,040 of October 1, 1931, relates to the chlorination of different organic derivatives in the presence of a catalyst consisting of sulphur and antimony trichloride to which may or may not be added known catalysts such as Fe, $PCl_5$, $AsCl_5$, and fragments of lead. The ratio by weight of the para-dichlorobenzene and the total of the ortho-chlorobenzene and more highly chlorinated products reached 4.75 for an operation of chlorination of benzene brought up to 20–25° C.; but it is known that at this temperature the para-dichlorobenzene has relatively low solubility in benzene, mono-chlorobenzene or their mixtures. In order to avoid the technological difficulties due to this abundant crystallisation, chlorinations at low temperatures are generally carried out to a limited extent, that is to say the proportion of chlorine and benzene is restricted to small values and a high proportion of mono-chlorobenzene is obtained. In order to ensure a substantial production of para-dichlorobenzene it is therefore necessary to employ apparatus having a very large volume and very large quantities of mono-chlorobenzene are thus simultaneously obtained.

Other catalysts have been employed. Thus the French Patent No. 641,102 of April 29, 1927, teaches that the introduction of a halogen into benzene in contact with sulphuric acid results in a liquid mixture containing at least 80% of mono-chlorobenzene, provided that sulphonation is avoided.

The applicant has given further study to this problem, in view of the difficulties and drawbacks involved in the different known methods of chlorination of benzene derivatives. The applicant has sought to obtain, without causing considerable formation of polysubstituted derivatives, both a liquid mixture in which almost the entire quantity of the derivative to be chlorinated is converted to a di-substituted derivative and in which this di-substituted fraction contains a very substantial proportion of para-derivative as well as liquid mixtures which are less strongly chlorinated and which are also characterised by the high proportion of para-derivative in the di-substituted fraction. In the particular case of chlorination of benzene the present invention has for its object to obtain, without causing considerable formation of polychlorobenzene, crude mixtures which are remarkable on account of the high proportion of para-dichlorobenzene in the dichlorobenzene fraction, and the degree of chlorination of said mixtures may be increased up to the almost complete conversion to dichlorobenzenes.

These researches and tests have enabled the applicant to find on the one hand that the known chlorination catalysts permit of the fixation of chlorine on cyclic aromatic derivatives to varying extents and that it is necessary to use active catalysts if it is desired completely to absorb substantial quantities of chlorine in this kind of liquid to be chlorinated, and on the other hand that these catalysts are not liable to direct the fixation of the chlorine towards the production of a predetermined di-substituted derivative to the full extent required. But these researches have enabled the applicant to observe that this orientation of the fixation of the chlorine so as to obtain a pre-determined di-substituted derivative may be ensured by the conjoint use of a chlorination catalyst and of certain chemical compounds (which will be referred to below by the term "orientation catalysts"); under these conditions, making use of an orientation catalyst, the applicant has observed that it becomes possible to guide the fixation of chlorine on a benzene nucleus.

The present invention thus relates to a method of obtaining, by means of catalysts, di-substituted chlorinated benzene derivatives in which one atom of chlorine substituted for a hydrogen atom is in the para-position with respect to either a second atom of chlorine, a linear or cyclic radical or a functional group, these latter being also substituted, the said method consisting essentially in that the compound to be chlorinated, containing in the dissolved state a chlorination catalyst, is put into intimate contact with an orientation catalyst which is capable of constituting a separate phase and also consisting in that, after the required degree of chlorination has been reached the mass is separated into two liquid phases and the liquid is then treated in known manner for the separation and purification of its constituents. In the case in which the orientation catalyst constitutes a different phase of the liquid to be chlorinated it may, however, be very slightly soluble in this liquid.

The description which follows relates to the case in which the orientation catalyst constituting a separate liquid phase has very limited solubility in the liquid to be chlorinated.

In this description, the term "liquid" is intended to refer to the phase containing the derivative which is subjected to the chlorination process and by "orientating phase" is intended to mean the phase containing or constituting the orientation catalyst.

The presence of an orientation catalyst has for its result that the proportion between the quantity of para-derivatives and the quantity of ortho derivatives which is obtained during a chlorination operation carried out in accordance with the invention, is substantially greater than would have been the case had this operation been carried out without the orientation catalyst in question, all other conditions being equal. The presence of the orientation catalyst therefore has an appreciable influence, irrespective of the nature and the activity of the chlorination catalyst. Furthermore, this orientation catalyst often acts as a "synergist" of the chlorination catalyst, that is to say it amplifies the reactivity of the chlorination catalyst and permits of a more quantitative absorption of the chlorine by the medium to be chlorinated.

In order that the method forming the object of the invention may be put into operation, the majority of known chlorination catalysts may be employed, particularly the usual metallic or metalloid chlorides, the metallic or metalloid sulphides, sulphur added to or combined with the chlorides, and chloro-sulphides. However, the means of obtaining high yields of chlorination at the same time as a high efficiency of conversion of the liquid mixture into a di-substituted derivative as well as a high proportion of para derivative in the substituted fraction is assisted by the use of very active chlorination catalysts such an antimony sulphide, antimony chloride, and the antimony chloro-sulphides in a quantity which is sufficient to permit of an absolutely total reaction of the chlorine with the liquid to be chlorinated.

In accordance with the usual practice, the chlorination catalyst may be dispersed in the liquid to be chlorinated; this does not prevent a portion of this catalyst from passing, in the course of the operation, into the orientating phase or from being introduced into it beforehand. The quantity of chlorination catalyst is the quantity normally employed to obtain the desired activity.

The method in accordance with the invention permits of intimate contact between the liquid to be chlorinated and the orientation catalyst. If two liquid phases are present (orientating phase and liquid to be chlorinated) each of these phases often dissolves a certain fraction of the other, but this mutual solubility is usually too small to ensure the desired intimate contact between the liquid to be chlorinated and the orientation catalysts; and this leads to the use of any known means so as to ensure the intimate contact which is desired; for this purpose an energetic stirring operation is preferably effected so that at least part of the orientating phase is intimately dispersed in the liquid to be chlorinated.

When the desired degree of chlorination has been reached, the mass which usually separates into two liquid phases is then allowed to rest. The liquid is then isolated and treated in known manner so as to separate these constituents and to purify them. The other phase containing the orientation catalyst and subsequently completed by an addition of fresh product may again serve for a further chlorination operation.

In order to orientate either the substitution of an atom of chlorine in the para-position on a nucleus which is already mono-substituted, or the substitution of two atoms of chlorine on a non-substituted nucleus, during the same chlorinating operation, it is an advantage to make use of an orientation catalyst consisting of mixtures of sulphuric acid and sulphonic acids with low water content. These mixtures may be prepared by sulphonation of a hydrocarbon in a separate chamber and may subsequently be placed in contact with the liquid to be chlorinated. If the acid corresponding to a hydrocarbon which is present in the liquid to be chlorinated is chosen as a sulphonic acid, it is also possible to put the liquid in question in contact with sulphuric acid or oleum; the conditions of temperature and of concentration of the acid are then selected so as to obtain the desired sulphonation effect usually represented by the formation of two distict liquid phases, of which the desired relative quantities can be determined in known manner. If a very concentrated acid is employed to carry out this sulphonation it may subsequently prove to be necessary to add a small quantity of water or diluted sulphuric acid in order to bring the concentration of the orientating phase back to within the desired limits.

In order to constitute the mixture which forms the orientation catalyst, various sulphonic acids may be employed, from the first term of the series, benzene sulphonic acid, to acids having a hydrogen atom substituted by an already heavy radical. By way of example, the more common sulphonic acids may be cited such as benzene sulphonic acid, the ortho- and para-toluene sulphonic acids, para-chlorobenzene sulphonic acid, dodecyl-benzene sulphonic acid or mixtures of these various acids. The most effective mixtures are those which contain, in the case of benzene sulphonic acid, 30 to 40% benzene sulphonic acid, 50 to 60% sulphuric acid, 5 to 15% water; in the case of the toluene sulphonic acids, 10 to 50% of one of these acids or of their mixtures, 40 to 70% sulphuric acid, 5 to 15% water; in the case of para-chlorobenzene-sulphonic acid, 20 to 40% para-chlorobenzene-sulphonic acid, 50 to 75% sulphuric acid, 5 to 10% water; in the case of dodecyl-benzene sulphonic acid, 5 to 15% dodecyl-benzene sulphonic acid, 15 to 40% benzene sulphonic acid, 40 to 70% sulphuric acid, 5 to 15% water.

When the orientation catalyst is contained in one phase, the proportion of this latter with respect to the liquid to be chlorinated may vary in large proportions on account of the possible development of certain secondary reactions; it is not recommended to employ an orientating phase having a weight greater than 40% of the weight of the liquid; proportions between 3 and 30% give very good results.

The method may be put into operation over a wide range of temperature, thus enabling various stages of the chlorination process to be effected at temperatures which differ from each other.

The method which forms the object of the invention has for its result further interesting advantages in addition to the advantages arising from the foregoing: on the one hand the presence of the orientation catalyst improves the absorption of the chlorine by the liquid to be chlorinated to the extent that the absorption becomes practically quantitative, and on the other hand the presence of the orientation catalyst reduces the quantity of the more heavily chlorinated derivatives formed in the course of chlorination.

The present invention is particularly applicable to the chlorination of benzene, monochlorobenzene or their mixtures. As previously indicated, this chlorination results in a liquid which is often referred to as "crude liquid" in which are generally found ortho-, para-, meta-dichlorobenzene, trichlorobenzene and even higher chlorinated derivatives, together with a variable quantity of benzene and monochlorobenzene. The relative proportions of these various compounds vary as a function of the conditions of the operation, in particular of the chlorine-benzene ratio employed, of the speed of flow of the chlorine, of the temperature and of the catalyst employed.

The present invention permits of a high degree of chlorination of benzene, monochlorobenzene and their mixtures represented by a small proportion of benzene or of residual monochlorobenzene, a high proportion of para-dichlorobenzene in the fraction of dichlorobenzene and a very small proportion of more highly chlorinated derivatives. So as to obtain good reaction conditions, it is preferable that the chlorination catalyst content should be between 0.1% and 0.8% in the case of $Sb_2S_3$; between 0.05% and 0.5% in the case of $FeCl_3$; between 0.1% and 1% with $SbCl_3$ and 0.1% to 0.5% of S in the case of the mixture of S and $SbCl_3$, with respect to the liquid to be chlorinated. The figures already given above for the relative proportions of the two phases are suitable for the chlorination of benzene. Suitable temperatures are from 15° C. to 60° C. By means of this range of temperature, the temperature at the beginning of the chlorination process may be brought to 15–20° C. until the degree of chlorination is such that there is some danger of crystallization of the para-dichlorobenzene, which is in turn liable to cause technological difficulties, the temperature at this moment being raised to 50° C. or even 60° C. Towards 20° C., technological difficulties generally become apparent after the introduction of ⅔ of the chlorine corresponding to the integral conversion of the benzene to dichlorobenzenes. In the application of the method to the chlorination of benzene, high speeds may be employed for the introduction of chlorine. For example, the quantity of chlorine corresponding to the total conversion of the benzene to dichlorobenzene may be introduced in a non-continuous operation in 12 hours without allowing the chlorine content of the evolved hydrochloric acid to exceed 10 parts per million.

There follows below a detailed description of a certain number of examples of practical utilization of the method in accordance with the present invention, in its application to the chlorination of benzene.

Example I

A number of experiments have been carried out in the following manner:

5 grams of pure antimony trichloride, then 2 grams of sulphur were dissolved in 2 kgs. of benzene dried by azeotropic distillation. This solution was placed in a glass balloon flask provided with a stirrer and a device enabling the solution to be cooled or heated, chlorine was injected into the solution for 45 minutes at the fairly rapid rate of 240 grams per hour, then 350 grams of a mixture of sulphuric acid and benzene sulphonic acid was poured into the flask, this mixture being composed as follows: $H_2SO_4$: 59%, $C_6H_5.SO_3H$: 33%, water: 8%. Stirring was continued so as to ensure the desired intimate contact between the two liquid phases. After pouring the acid and after formation of an intimate mixture of the two phases, the rate of flow of chlorine was brought up to 355 grams per hour and the cooling was adjusted so as to reach 20° C. This flow of chlorine was maintained until about two thirds of the chlorine corresponding to the complete conversion of the benzene to dichlorobenzene had been introduced while the content of the evolved hydrochloric acid was not more than 10 parts per million of chlorine. The rate of flow of chlorine was then reduced to 240 grams per hour and the temperature was allowed to rise again when the crystals of para-dichlorobenzene began to appear. This took place while chlorinating at 20° C., when ⅘ of the chlorine required had been introduced. The flow of chlorine was stopped when, taking into account the benzene carried away by the evolved hydrochloric acid, about 95% of the chlorine corresponding to the total conversion to dichlorobenzene had been introduced.

When the delivery of the chlorine was stopped, the mass was heated to about 50° C. so as to avoid the presence of crystallized para-dichlorobenzene and was then allowed to decant. The liquid was then washed with commercial hydrochloric acid diluted to ⅓ so as to eliminate various impurities, in particular antimony chloride, then neutralized, dried and distilled.

The average compositions of liquid obtained in the course of a number of operations were as follows:

| | Percent |
|---|---|
| Residual benzene | 0.05 |
| Monochlorobenzene | 5 to 10 |
| Dichlorobenzene | 90 to 95 |
| Higher chlorinated derivatives | 0.2 |

$$\frac{Para}{Ortho} \text{ ratio} = 5 \text{ to } 6.5$$

The proportion of para-dichlorobenzene in the dichlorobenzene fraction varied between 80 and 86%. It should be noted that approximately 5% of the benzene was carried away in the form of vapor by the hydrochloric acid liberated; it was in any case possible to recover this benzene.

The orientation catalyst (mixture of sulphuric acid and benzene sulphonic acid) which was put in contact with the liquid to be chlorinated was prepared as follows:

1,200 grams of sulphuric acid of very good purity with a content of 94% of $H_2SO_4$ was poured into 700 grams of dry benzene at about 50° C. and stirred violently while being poured; the pouring operation was carried out gradually in about 1 hour 30 minutes and the temperature was raised to 58°–60° C. while continuing to stir for 1 hour 30 minutes at this temperature. After cooling down to 40° C., the mixture was allowed to decant. The lower layer (with a content of 59% $H_2SO_4$, 33% of $C_6H_5SO_3H$ and 8% $H_2O$) was collected so as to be used as an orientation catalyst as indicated above. The same mixture could have been obtained starting from sulphuric acids having a different initial concentration.

In order to verify the effectiveness of the action of the orientation catalyst, the above results were compared with those obtained in chlorination operations carried out in accordance with known methods, without contact with benzene sulphonic acid (that is to say without orientation catalyst) using the same chlorination catalyst at similar temperatures, with the same or lower speeds of flow of chlorine, and also brought to the same point of chlorination, that is to say up to the passage of 95% of the chlorine corresponding to the complete conversion to dichlorobenzenes of the benzene contained in the initial liquid. These known methods gave the following results:

| Chlorination liquid: | Percent |
|---|---|
| Monochlorobenzene | 7.5 |
| Dichlorobenzenes | 92.2 |
| Trichlorobenzenes | 0.3 |

Proportion of chlorine in the gases at the end of the chlorination process: 2% by weight with respect to the hydrochloric acid.

In the fraction of the dichlorobenzenes, the proportion of paradichlorobenzene was less than 80%, and generally in the vicinity of 75%.

Example II

The operation was carried out as in Example I by putting 0.25% of powdered $Sb_2S_3$ in suspension in the benzene instead of $S+SbCl_3$.

By applying known methods in comparison with the method of the invention, results were obtained as summarized in the table below:

|  | Method of the invention | Known method, percent |
|---|---|---|
| Chlorination liquid: | | |
| monochlorobenzene | 8.4% | 7.9 |
| dichlorobenzene | 91.6% | 91.7 |
| higher chlorine derivatives (mainly trichlorobenzenes) | <0.1% | 0.4 |
| Cl in evolved HCl | <10 parts per m. | 1 |
| proportion of paradichlorobenzene in the dichlorobenzene fraction | 84% | 77 |

*Example III*

The operation was carried out using ferric chloride as the chlorination catalyst. By employing the orientation catalyst in accordance with the invention, it was possible to obtain the following results:

Chlorination liquid: Percent
Monochlorobenzene _____ 8.6
Dichlorobenzene _____ 91.3
Higher chlorine derivatives _____ 0.1

Proportion of para-dichlorobenzene in the fraction of dichlorobenzenes : 82%.
Quantity of chlorine carried away by HCl:<10 parts per million.

*Example IV*

In order to form the orientation catalyst in contact with the liquid to be chlorinated, 2 kgs. of dry benzene were taken and in this were dissolved 5 grams of SbCl₃ and 2 grams of sulphur. As in Example I, chlorine was injected into the solution for 45 minutes at the rate of 240 grams per hour and 300 grams of 96% sulphuric acid were then poured into the solution. The mass was then stirred for 15 minutes at a temperature of 55° C., and the rate of flow of chlorine was brought up to the value of 335 grams per hour while allowing the mass to cool down to 20° C. The operation was then continued as in Example I and gave results within the limits indicated in this example.

Comparable results were obtained by starting from 20% oleum instead of 96% sulphuric acid but by pouring the oleum slowly when the temperature of the mass reached 20° C. instead of 55° C., then by proceeding to operate as above after this partial sulphonation.

*Example V*

The orientation catalyst was prepared starting from 700 grams of toluene, into which was poured 1,200 grams of 94% sulphuric acid and the mixture was then violently stirred at a temperature kept at 45° C. After cooling to 35° C. and decantation, 1,626 grams of sulphonic layer were isolated and to these were added 500 grams of 94% sulphuric acid. 350 grams of this mixture were introduced in the liquid which contained the chlorination catalyst and which was already in course of chlorination. After stirring the two phases and obtaining by this means the desired intimate contact between these phases, and after cooling the entire mixture to 20° C., the operation was continued as in Example I and the content of the liquid thus obtained was as follows:

Percent
Monochlorobenzene _____ 7.8
Dichlorobenzenes _____ 92.2

Proportion of para-dichlorobenzene in the fraction of dichlorobenzenes : 83%.

*Example VI*

SbCl₃+SCl₂ was employed as a chlorination catalyst. Thus 5 grams of SbCl₃ and 3 cu. cm. of sulphur bichloride were dissolved in 2 kgs. of dry benzene. After commencement of the chlorination reaction, 350 grams of benzene sulphonic acid having the same composition as defined in Example I were then poured into the mixture and the operation was then proceeded with as indicated in that example. A crude liquid was obtained having the following content:

Percent
Monochlorobenzene _____ 5.5
Dichlorobenzenes _____ 94.3
Trichlorobenzenes _____ 0.2

In the fraction of dichlorobenzenes, the proportion of para-dichlorobenzene was equal to 85%.

*Example VII*

In this example sulphur was introduced in the form of a solution into the carbon sulphide.

In 2 kgs. of dry benzene, 5 grams of SbCl₃ were dissolved and 5 cu. cm. of a lukewarm (40° C.) saturated solution of sulphur were poured into the carbon sulphide. After the chlorination reaction had started 350 grams of benzene sulphonic acid having the same composition as defined above were then added and the operation was proceeded with as defined in Example I.

In the fraction of dichlorobenzene the proportion of para-dichlorobenzene was equal to 84.5%.

*Example VIII*

The orientation catalyst was prepared starting from an acid having a content of 60% sulphuric acid, 37% para-chlorobenzene sulphonic acid and 3% water diluted with 5% of ice. During chlorination, 350 grams of this acid were poured into 2 kgs. of benzene catalyzed by 5 grams of SbCl₃ and 2 grams of sulphur. The composition of the liquid at the end of the chlorination process was as follows:

Percent
Monochlorobenzene _____ 10
Dichlorobenzenes _____ 90

Proportion of para-dichlorobenzene in the di-fraction: 82%.

*Example IX*

In 2.2 kgs. of dry benzene catalyzed by 6 grams of SbCl₃ and 2.5 grams of sulphur, a mixture was injected containing 50% of chlorine and 50% of nitrogen by volume. After the chlorination reaction had started, 350 grams of crude benzene sulphonic acid prepared in the same manner as in Example I were then poured into this mixture.

The composition of the liquid at the end of the chlorination process was as follows:

Percent
Monochlorobenzene _____ 7.0
Dichlorobenzenes _____ 93.0

In the di-fraction, the proportion of para-dichlorobenzenes was equal to 83%.

*Example X*

In 2.2 kgs. of dry benzene catalyzed by 6 grams of SbCl₃ and 2.5 grams of sulphur, a mixture was injected containing 50% chlorine and 50% HCl by volume. After the commencement of the chlorination reaction, 350 grams of benzene sulphonic acid were then added and the operation was continued as in Example I.

In the fraction of dichlorobenzenes, the proportion of para-dichlorobenzene was equal to 84.5%.

*Example XI*

In 2.1 kgs. of dry benzene, 5 grams of antimony trichloride and 3 grams of sulphur were dissolved. After injecting 180 grams of chlorine in the course of 45 minutes, 350 grams of a mixture of benzene and dodecylbenzene sulphonic acids were then added.

In order to constitute the orientating phase, sulphonation of the benzene was effected on the one hand (for this purpose 1,200 grams of 95% sulphuric acid were poured into 700 grams of benzene, then stirred for 1 hour 30 minutes at 60° C., then allowed to decant). The operation effected on the other hand was to sulphonate dodecylbenzene commonly referred to as alkylate, which is the raw material of alkylarylsulphonate detergents; for this purpose 500 grams of 95% sulphuric acid were poured into 100 grams of alkylate and stirred for 1 hour 30 minutes at 60° C.

Following this, 1,400 grams of crude benzene sulphonic acid were then mixed with 600 grams of crude dodecylbenzene sulphonic acid (not decanted); a liquid was thus obtained having a content of 60.8% $H_2SO_4$, 25.2% $C_6H_5SO_3H$,

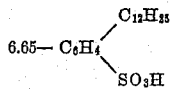

and 7.35% water.

After 350 grams of this mixture had been poured into the benzene to be chlorinated, the rate of flow of chlorine was brought up to 355 grams per hour and the cooling of the liquid was regulated at 20° C.

By conducting the end of the operation as in Example I a chlorination liquid was obtained containing:

| | Percent |
|---|---|
| Monochlorobenzene | 12.8 |
| Dichlorobenzenes | 87.2 |

The proportion of para-dichlorobenzene in the di-fraction was equal to 86.5%.

What I claim is:

1. A method of preparation, with the use of catalysts, of di-substituted chlorinated benzine derivatives, in which one atom of chlorine is substituted for a hydrogen atom in the para-position with respect to a constituent selected from the class consisting of a second atom of chlorine, linear radical which is also substituted, a cyclic radical which is also substituted, and a functional group which is also substituted, said method consisting essentially in the steps of: taking the compound to be chlorinated, containing at least one substitutive chlorination catalyst which is a member selected from the group consisting of metallic chlorides, metalloid chlorides, metallic sulphides, metalloid sulphides, mixtures of sulphur with any of the above members, and chloro-sulphides; putting said compound into intimate contact with 3 to 40% by weight of an orientation catalyst selected from the group consisting of mixtures of sulphuric acid and sulphonic acids of the group consisting of benzene sulphonic acids, alkylbenzene sulphonic acids and their chloro-sulphonic acids, said mixtures having a low water content; separating the mass into two liquid phases when the required degree of chlorination has been reached; and then treating the liquid in known manner to separate and purify the constituents.

2. A method as claimed in claim 1, in which said intimate contact is obtained by energetic stirring of the liquid mixture of the orientation phase and the liquid to be chlorinated.

3. A method as claimed in claim 1, and comprising the further steps of: allowing the liquid mixture to rest when the desired degree of chlorination has been reached; from the two liquid phases which are thus obtained, isolating the chlorinated liquid and treating said liquid in known manner in order to separate and purify the constituents; and adding fresh orientation catalyst to the liquid orientation phase for use in a further chlorination operation.

4. A method as claimed in claim 1, in which the chlorination catalyst employed is selected from the group consisting of ferric chloride, antimony sulphide, antimony chloride, the antimony chloro-sulphides, and mixtures of sulphur with said chlorides and sulphides.

5. A method as claimed in claim 1, in which said orientation catalyst is prepared by sulphonation of a hydro-carbon in a separate chamber, before putting in contact with the liquid to be chlorinated.

6. A method as claimed in claim 1, in which the orientation catalyst comprises: 30 to 40% benzene sulphonic acid; 50 to 60% sulphuric acid; 5 to 15% water.

7. A method as claimed in claim 1, in which the orientation catalyst comprises: 10 to 50% of one of the toluene sulphonic acids; 40 to 70% sulphuric acid; 5 to 15% water.

8. A method as claimed in claim 1, in which the orientation catalyst comprises: 20 to 40% parachlorobenzene sulphonic acid; 50 to 75% sulphuric acid; 5 to 10% water.

9. A method as claimed in claim 1, in which the orientation catalyst comprises: 5 to 15% dodecylbenzene sulphonic acid; 15 to 40% benzene sulphonic acid; 40 to 70% sulphuric acid; 5 to 10% water.

10. A method as claimed in claim 1, in which said substitutive chlorination catalyst is antimony sulphide having a weight of between 0.1% and 0.8% of the liquid to be chlorinated.

11. A method as claimed in claim 1, in which said substitutive chlorination catalyst is ferric chloride having a weight between 0.5% and 0.05% with respect to the weight of the liquid to be chlorinated.

12. A method as claimed in claim 1, in which said substitutive chlorination catalyst is antimony chloride having a weight between 0.1% and 1% with respect to the weight of the liquid to be chlorinated.

13. A method as claimed in claim 1, in which said substitutive chlorination catalyst is a mixture of sulphur and antimony chloride having a proportion by weight of 0.1% and 0.5% of sulphur with respect to the weight of the liquid to be chlorinated.

14. A method as claimed in claim 1, in which the reaction of chlorination is effected at temperatures between 15° C. and 60° C.

15. A method as claimed in claim 14, in which the temperature at the beginning of the chlorination process is brought to 15 to 20° C. until crystallization of the para-dichloro-benzene begins to appear, the temperature at this moment being raised to 50° C.–60° C.

FOREIGN PATENTS 691,504    Great Britain _____ May 13, 1953